United States Patent
Nishimura et al.

(10) Patent No.: US 12,130,633 B2
(45) Date of Patent: Oct. 29, 2024

(54) TRAVEL ROUTE CONTROL OF AUTONOMOUS WORK VEHICLE

(71) Applicant: Honda Motor Co., Ltd., Tokyo (JP)

(72) Inventors: Jin Nishimura, Saitama (JP); Yuki Matsui, Saitama (JP); Haruna Minawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 17/958,442

(22) Filed: Oct. 3, 2022

(65) Prior Publication Data

US 2023/0168687 A1 Jun. 1, 2023

(30) Foreign Application Priority Data

Nov. 29, 2021 (DE) .......................... 102021131214.0

(51) Int. Cl.
   *G05D 1/02* (2020.01)
   *G05D 1/00* (2006.01)
(52) U.S. Cl.
   CPC .................................. *G05D 1/0265* (2013.01)
(58) Field of Classification Search
   CPC .......................... G05D 1/0225; G05D 1/0265
   See application file for complete search history.

(56) References Cited

U.S. PATENT DOCUMENTS

| | | | |
|---|---|---|---|
| 6,465,982 B1 * | 10/2002 | Bergvall | ............... A47L 9/2889 318/587 |
| 8,942,862 B2 | 1/2015 | Markusson et al. | |
| 9,072,219 B2 | 7/2015 | Da Rocha et al. | |
| 2020/0042011 A1 | 2/2020 | Ärlig et al. | |
| 2020/0356110 A1 | 11/2020 | Holgersson et al. | |
| 2020/0401146 A1 | 12/2020 | Strandberg | |

FOREIGN PATENT DOCUMENTS

| | | |
|---|---|---|
| DE | 69829411 | 1/2006 |
| EP | 2558918 | 2/2018 |
| EP | 2547191 | 9/2018 |
| EP | 3346348 | 11/2019 |
| JP | 2021112146 | 8/2021 |
| WO | 2019183907 | 10/2019 |
| WO | 2021208010 | 10/2021 |

OTHER PUBLICATIONS

"Office Action of Germany Counterpart Application" with English translation thereof, issued on Dec. 19, 2022, p. 1-p. 18.

* cited by examiner

*Primary Examiner* — Brian P Sweeney
(74) *Attorney, Agent, or Firm* — JCIPRNET

(57) ABSTRACT

An autonomous work vehicle is adapted to be guided by a signal emitted by a wire disposed at a working area. The autonomous work vehicle includes a control unit comprising a processor, and at least one sensor detecting the signal emitted by the wire. The wire includes an area wire surrounding the working area, and a shortcut wire disposed inside the working area. When the at least one sensor detects the shortcut wire while the autonomous work vehicle is tracing the area wire at a predetermined variable distance, the control unit is configured to control the autonomous work vehicle to trace the shortcut wire at a predetermined variable distance.

5 Claims, 15 Drawing Sheets

| | LOCATION | APPROACH DIRECTION | JUDGEMENT CONDITION |
|---|---|---|---|
| First Case | A1 | - | AREA SIGNAL (IN -> OUT)<br>SHORTCUT SIGNAL 1 (IN -> OUT)<br>SHORTCUT SIGNAL 2 (OUT or NONE) |
| Second Case | A2 | - | AREA SIGNAL (IN -> OUT)<br>SHORTCUT SIGNAL 1 (OUT or NONE)<br>SHORTCUT SIGNAL 2 (IN -> OUT) |
| Third Case | A3 | - | AREA SIGNAL (IN -> OUT)<br>SHORTCUT SIGNAL 1 (IN -> OUT)<br>SHORTCUT SIGNAL 2 (IN -> OUT) |
| Fourth Case | FIRST SHORTCUT WIRE | LEFT | AREA SIGNAL (IN)<br>SHORTCUT SIGNAL 1 (IN -> OUT)<br>SHORTCUT SIGNAL 2 (IN or NONE) |
| | | RIGHT | AREA SIGNAL (IN)<br>SHORTCUT SIGNAL 1 (OUT -> IN)<br>SHORTCUT SIGNAL 2 (IN or NONE) |
| Fifth Case | SECOND SHORTCUT WIRE | LEFT | AREA SIGNAL (IN)<br>SHORTCUT SIGNAL 1 (IN or NONE)<br>SHORTCUT SIGNAL 2 (OUT -> IN) |
| | | RIGHT | AREA SIGNAL (IN)<br>SHORTCUT SIGNAL 1 (IN or NONE)<br>SHORTCUT SIGNAL 2 (IN -> OUT) |

FIG. 17

TRAVEL ROUTE CONTROL OF AUTONOMOUS WORK VEHICLE

CROSS-REFERENCE TO RELATED APPLICATION

The present application is based on, and claims priority from German patent application no. 10 2021 131 214.0, filed Nov. 29, 2021, the disclosure of which is hereby incorporated by reference herein in its entirety.

BACKGROUND OF THE DISCLOSURE

Technical Field

The disclosure relates to travel route control of an autonomous work vehicle, and more specifically relates to travel route control of the autonomous work vehicle using a wire.

Related Art

Patent literature 1 discloses guiding an autonomous work vehicle such as a robotic lawn mower to a charging station using a short cut wire.

LITERATURE OF RELATED ART

Patent Literature

Patent Literature 1: EP Patent No. 2547191 B1

When a working area of the autonomous work vehicle that is delineated by an area wire (a boundary wire) is large, a probability of the autonomous work vehicle detecting the shortcut wire for returning to a predetermined destination (such as a charging station) may be low. When the working area is large, the autonomous work vehicle may travel a long distance without detecting the shortcut wire and power may be wasted.

In addition, when the working area is large, a probability of the autonomous work vehicle detecting the area wire before detecting the shortcut wire may become high. When the autonomous work vehicle detects the area wire and travels using the area wire, the autonomous work vehicle may need to travel a longer distance before arriving to the charging station. In such a situation, a travel distance of the robotic lawn mower is increased and power is wasted.

Furthermore, when the robotic lawn mower traces the shortcut wire or the area wire a number of times, a rut may be formed near the wire due to the passage of the robotic lawn mower. In this way, the grass or ground may be damaged or an appearance of the grass or ground may appear to be disorganized to a human eye.

Therefore, a way for reducing the travel distance of the robotic lawn mower, and a way for reducing the formation of a rut is needed.

SUMMARY

According to an embodiment of the disclosure, an autonomous work vehicle is adapted to be guided by a signal emitted by a wire disposed at a working area. The autonomous work vehicle includes a control unit comprising a processor, and at least one sensor detecting the signal emitted by the wire. The wire includes an area wire surrounding the working area, and a shortcut wire disposed inside the working area. When the at least one sensor detects the shortcut wire while the autonomous work vehicle is tracing the area wire at a predetermined variable distance, the control unit is configured to control the autonomous work vehicle to trace the shortcut wire at a predetermined variable distance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

FIG. 17 is a table illustrating an example on how the utility vehicle determines which of the multiple areas shown in FIG. 17 the utility vehicle is located in according to an embodiment of the disclosure.

DESCRIPTION OF THE EMBODIMENTS

Figure 1:
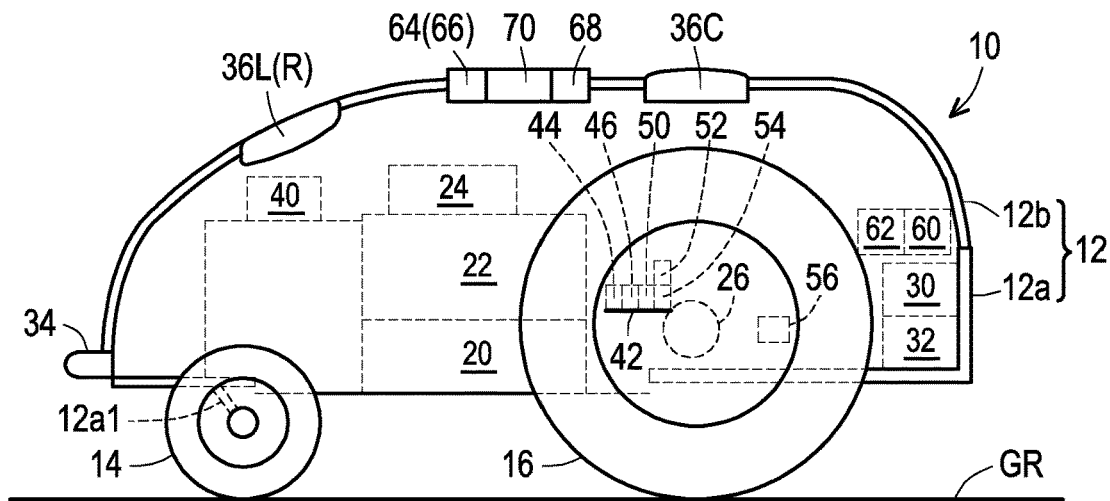
FIG. 1 is an overall schematic diagram showing a utility vehicle according to an embodiment of this disclosure.
Figure 2:
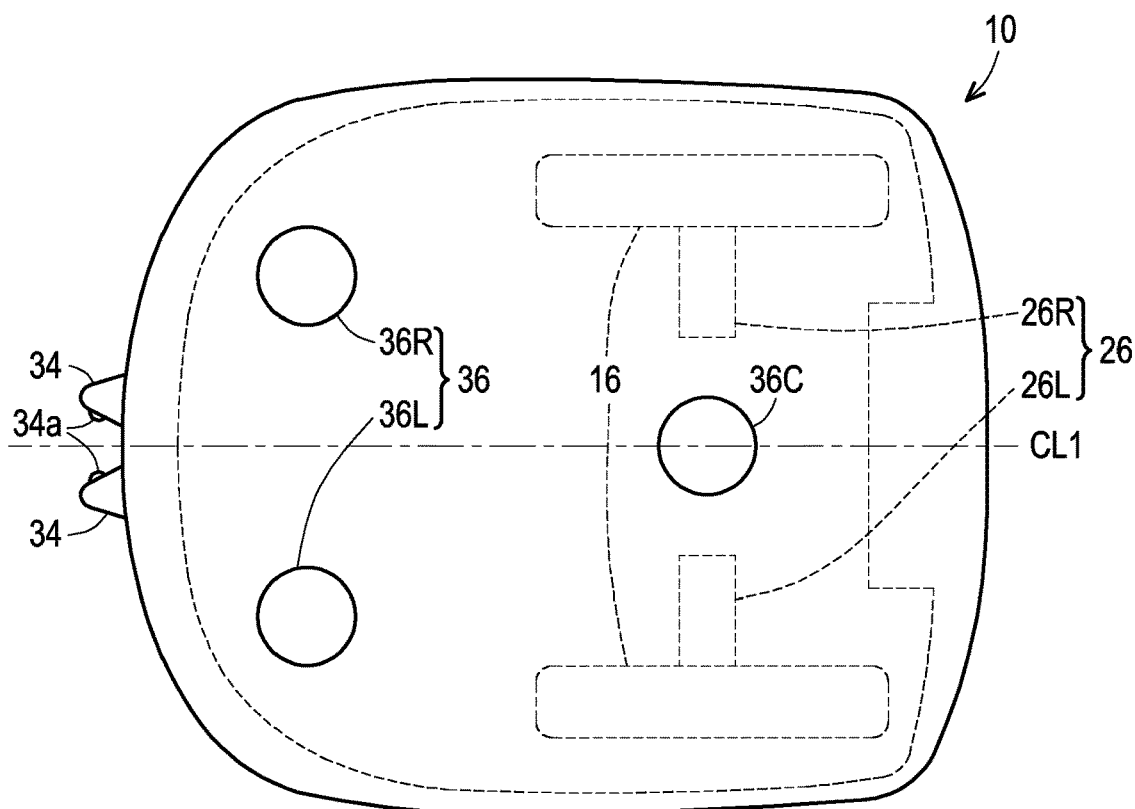
FIG. 2 is a plan view of the utility vehicle illustrated in FIG. 1.
Figure 3:
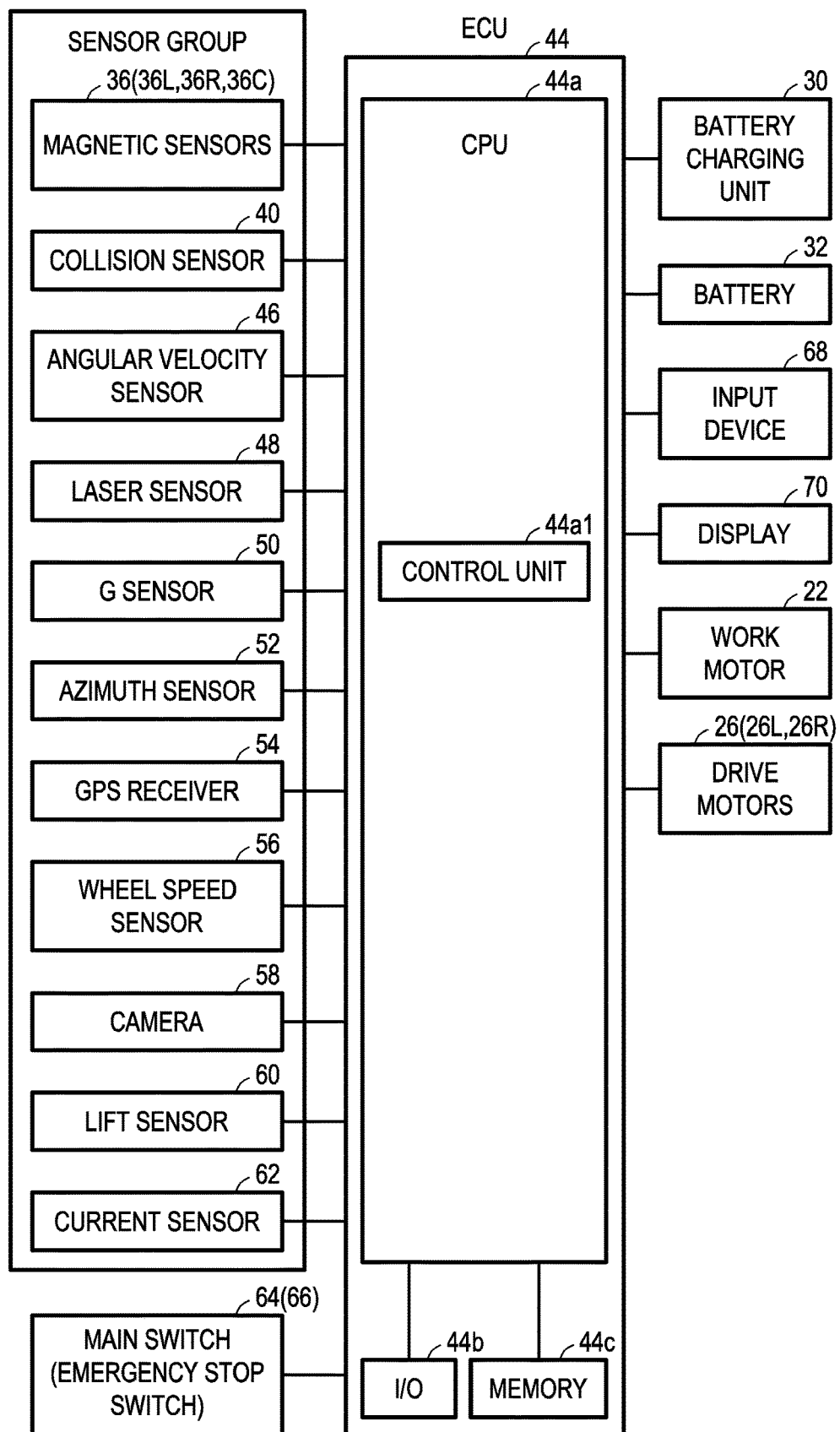
FIG. 3 is a block diagram showing inputs to an Electronic Control Unit installed in the utility vehicle illustrated in FIG. 1.

FIG. 1 is an overall schematic diagram showing a utility vehicle according to an embodiment of this disclosure, FIG. 2 is a plan view schematically illustrating the configuration of the utility vehicle illustrated in FIG. 1; and FIG. 3 is a block diagram showing the configuration of an electronic control unit (ECU) of the utility vehicle according to the present embodiment.

As shown in FIG. 1, reference symbol 10 designates a utility vehicle, more precisely an autonomously navigating utility vehicle, e.g., a mower; hereinafter called "vehicle".

The utility vehicle of the present disclosure can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22. The electric motor 22 is an example of a driving unit.

A blade height regulation mechanism 24 manually operable by an operator is connected to the blade 20. The blade height regulation mechanism 24 is equipped with a screw (not shown) and configured to enable the operator to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 10 are such that it can be transported or carried by the operator. As an example, the vehicle 10 may have a total length (forward-rearward direction length) about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle. The vehicle 10 is an example of an autonomous work vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a body center line CL of the vehicle body 12 running in the forward-rearward direction along the widthwise center of the vehicle 10. In addition, a third magnetic sensor 36C is installed on the body center line CL1 at a location remote from the sensors 36L and 36R. The magnetic sensors 36 produces an output indicating magnitude of magnetic field signal (magnetic field strength or intensity). The magnetic sensors 36R, 36L, 36C are examples of a signal detection part of the disclosure.

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor or processor) 44a, I/O 44b, and memory (ROM, RAM, EEPROM, etc.) 44c and the like. The ECU 44 is an example of a control unit.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that acquires a position of the vehicle 10). The GPS receiver 54 is an example of a Global Navigation Satellite System (GNSS) receiver, and acquires a position of the vehicle 10. The GNSS receiver is an example of a position information obtaining unit. As an example, the position data or position coordinates may be transmitted in National Marine Electronics Association (NMEA) format wherein the longitudinal and latitudinal coordinates are represented by degrees and decimal minutes.

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the operator or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotate one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the work in the working area AR.

The detection of the working area AR and the work thereat will be explained with reference to FIG. 4.

The working area AR is delineated by laying (burying) a boundary wire (electrical wire) 72 around a periphery (boundary) of the working area AR. A charging station 76 for charging the battery 22 of the lawnmower 10 may be installed inside or outside of the working area AR. In FIG. 4, the charging station 76 is disposed at a location inside the working AR. However, the disclosure is not limited thereto.

Figure 4:
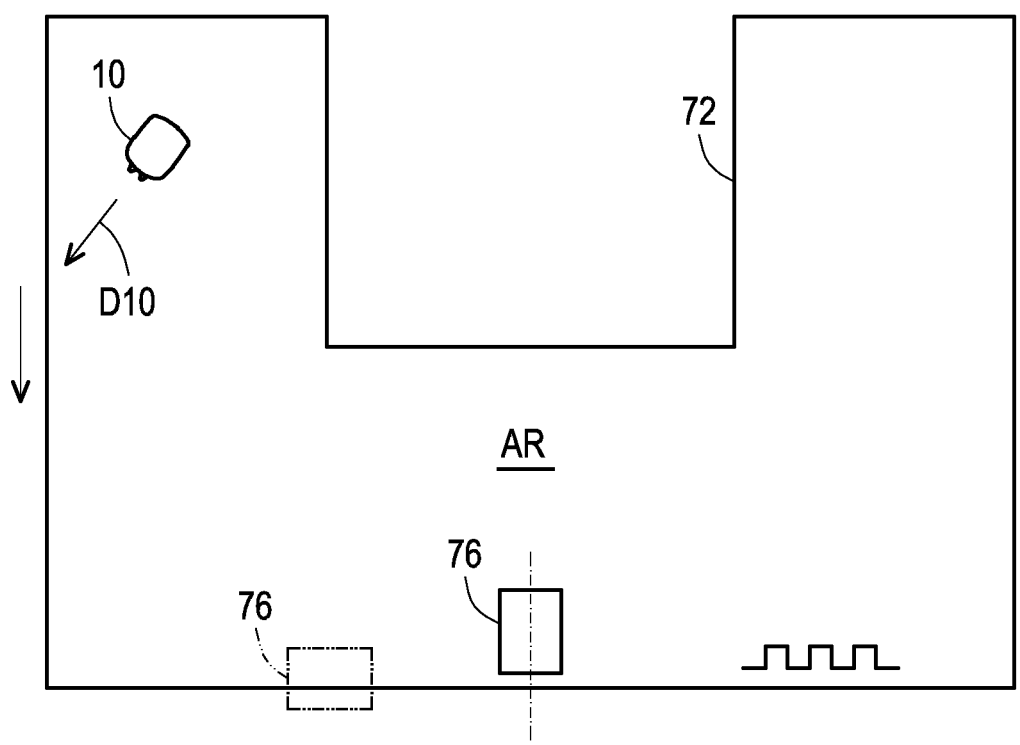
FIG. 4 is an explanatory diagram showing a working area (delimited by a boundary wire) of the utility vehicle illustrated in FIG. 1.
Figure 5:
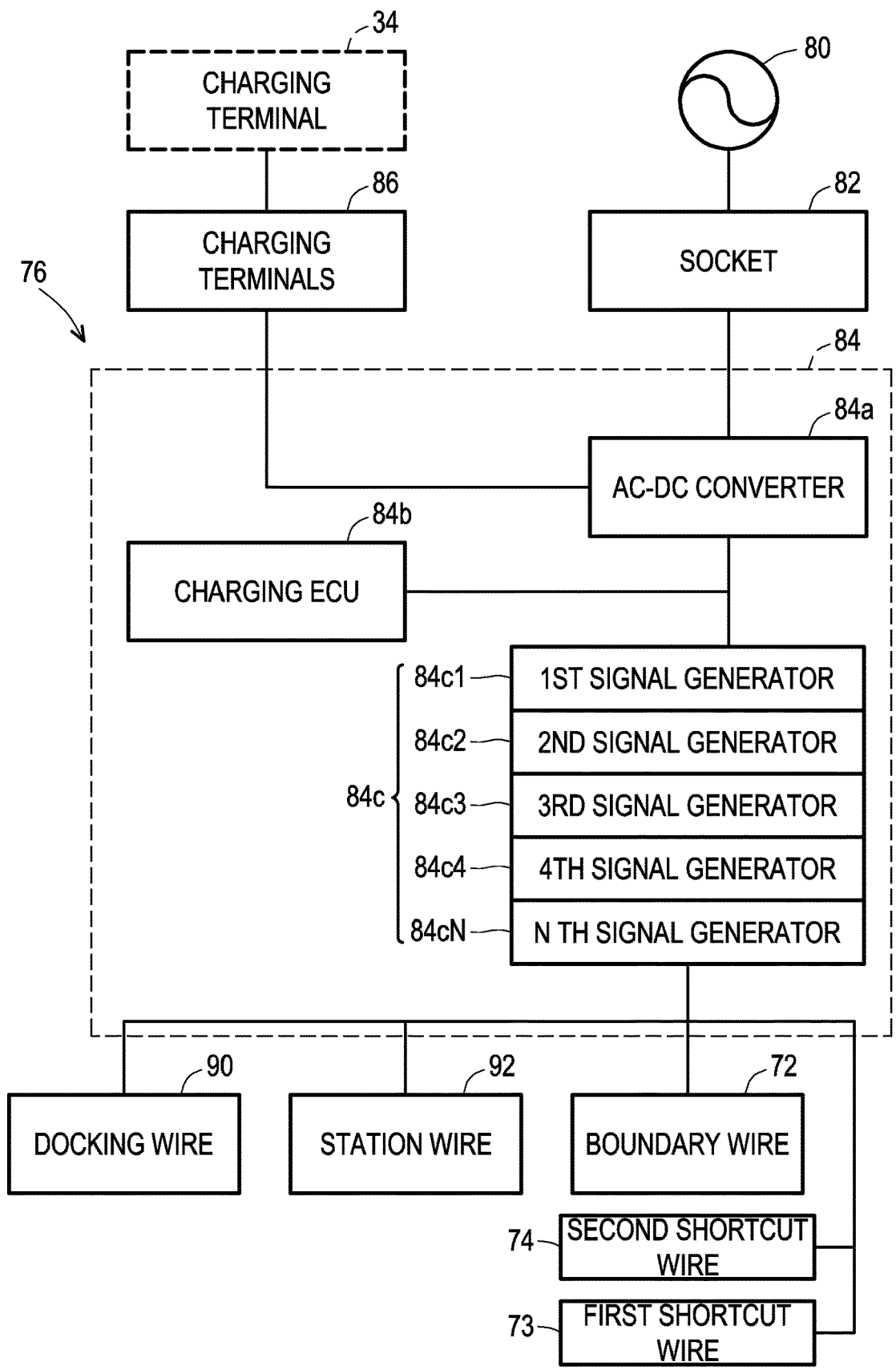
FIG. 5 is a block diagram showing configuration of a charging station of the utility vehicle shown in FIG. 4.

FIG. 5 is a block diagram showing an electrical configuration of a charging station in FIG. 4.

As shown in FIG. 5, the charging station 76 is equipped with a charger 84 connected to a commercial power supply 80 through a socket 82, and a pair of charging terminals 86 connected to the charger 84. The pair of charging terminals 86 are configured to be connectable to the pair of charging terminals 34 disposed on the vehicle 10 through the contacts 34a (shown in FIG. 2) of the pair of charging terminals 34.

The charger 84 is equipped with an AC-DC converter 84a, a charging ECU (Electronic Control Unit) 84b also comprising a microcomputer and used to control operation of the AC-DC converter 84a, and two signal generators 84c (a first signal generator 84c1 and a second signal generator 84c2). The first signal generator 84c1 and the second signal generator 84c2 are examples of a signal generating device.

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging contacts 34 and 86 when the lawnmower 10 is returned and connected to the charging station 76. The AC-DC converter 84a steps down the current to a suitable voltage in response to commands determined by the ECU 44 and sent from the charging ECU 84b.

At the same time, the output of the AC-DC converter 84 is supplied to the charging ECU 84b and signal generators 84c (comprising a first signal generator 84c1, a second signal generator 84c2, a third signal generator 84c3, a fourth signal generator 84c4 . . . a Nth signal generator 84cN). The charging ECU 84b is configured to be capable of communicating with the ECU 44 and controls operation of the signal generators 84c by sending binary data pulses.

In response thereto, the signal generators 84c convert the direct current stepped down by the AC-DC converter 84a into area signals in continuance sequence of pulse train and supply the generated area signals to the boundary wire 72, a docking wire 90 for guiding the vehicle 10 to a charging position, and a station wire 92 for delineating the charging station 76, a first shortcut wire 73, and a second shortcut wire 74.

Figure 6:
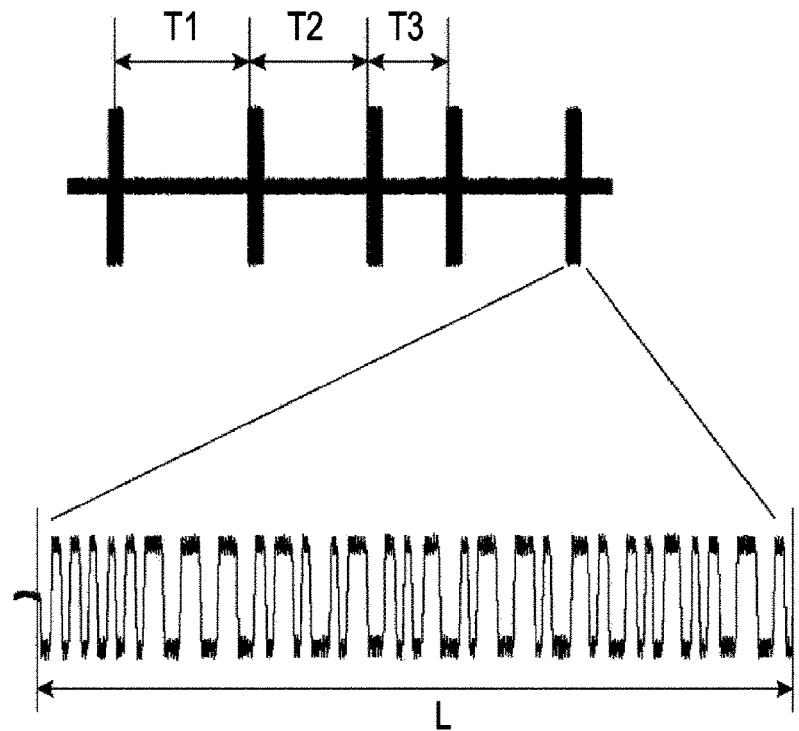
FIG. 6 is an explanatory diagram showing data signal of pulse train generated by a signal generator illustrated in FIG. 5.

FIG. 6 shows the pulse train generated by the first signal generator 84c1 to be passed through the boundary wire 72 that is corresponding to the binary data pulses sent from the charging ECU 84b. Although not shown, the pulse train signal generated by the second signal generator 84c2 may be similar to the pulse train generated by the first signal generator 84c1. However, in another embodiment of the disclosure, the pulse train signal generated by the second signal generator 84c2 may be different from the pulse train signal generated by the first signal generator 84c1. By generating different pulse train signals, different wires (such as area wire 72, guide wire 73, docking wire 90, station wire 92, the first shortcut wire 73, the second shortcut wire 74) may be differentiated and recognized by the vehicle 10 based on pulse train of the detected signal, and a general location of the vehicle 10 may be deduced.

It should be understood, a number of the signal generators may be determined according to requirements and is not limited hereto. In addition, the "wire" recited herein may refer to any wire, for example, the area wire 72, the guide wire 73, the docking wire 90, the station wire 92, the first shortcut wire 73, the second shortcut wire 74 and the like. In the present disclosure, for example, the guide wire 73 and guide wire 74 are configured as shortcut wires for the vehicle 10 to return to the station 76.

The detection of the working area AR shown in FIG. 4 will be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72. The magnetic sensors 36L, 36R, 36C are configured to detect a signal emitted by a signal generating device such as the first and second signal generators 84c1, 84c2.

Figure 7:
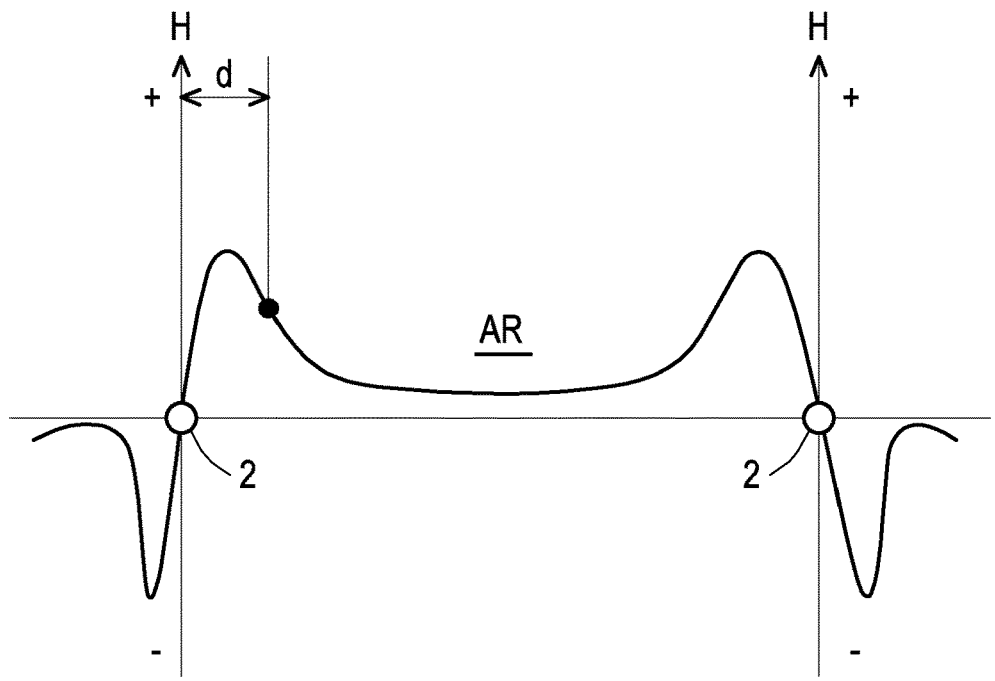
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
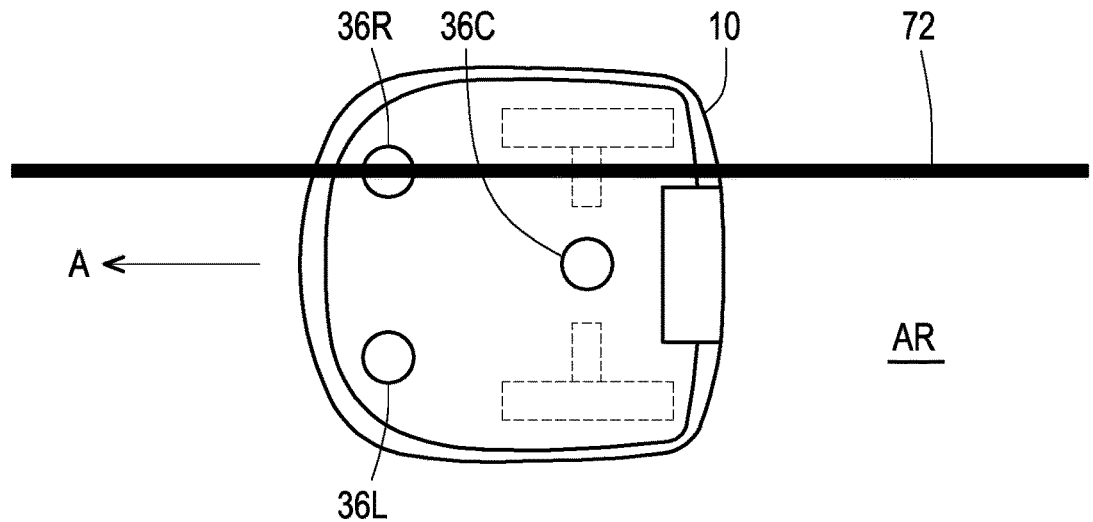
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

In the above embodiment, it was described where the magnetic sensor 36R detects a magnetic field signal emitted from a boundary wire 72 disposed at a working area AR, wherein the control unit 26 controls the vehicle 10 to trace the boundary wire 72 so that magnetic field strength H detected by the magnetic sensor 36R stays at 0, such that the vehicle 10 runs on the boundary wire 72.

In another embodiment of the disclosure, the control unit 26 may control the vehicle 10 to trace the boundary wire 72 at a predetermined variable distance by steering the vehicle 10 to keep the detected magnetic field signal H within a predetermined range or at a predetermined magnetic field signal H. The predetermined variable distance, for example, may be set between 1-2 meters, 2-5 meters, 1.3-3.6 meters, 2.0-10.0 meters and the like. The predetermined magnetic field signal H may correspond to a distance of 1.0, 2.0, 3.5 meters from the wire and the like. However, the disclosure is not limited thereto. The predetermined variable distance may be set to other distances or between other distance ranges according to requirements. The predetermined variable distance is set by keeping the detected magnetic field signal H within a predetermined range that corresponds to the target distances. The predetermined variable distance refers to, for example, a distance from the wire being traced to the body center line CL1 of the vehicle 10. In another embodiment of the disclosure, the predetermined variable distance refers to, for example, a distance from the wire to a side of the vehicle 10 that is closest to the wire. In another embodiment of the disclosure, the predetermined variable distance refers to, for example, a distance from the wire to a side of the frame 12b of the vehicle 10 that is closest to the wire. In another embodiment of the disclosure, the predetermined variable distance refers to, for example, a distance from the wire to one of the magnetic sensors 36.

Figure 9:
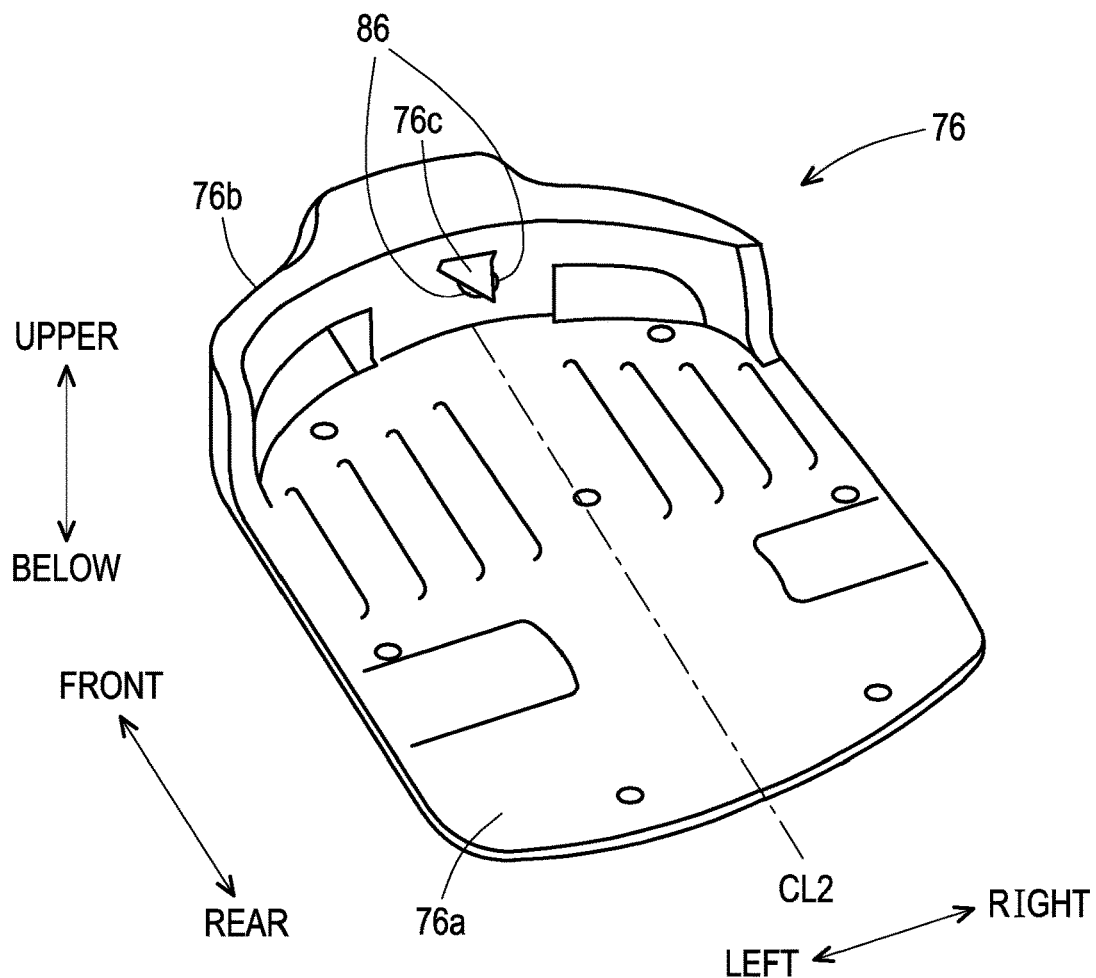
FIG. 9 is a perspective diagram illustrating the physical structure of the charging station according to an embodiment of the disclosure.

FIG. 9 is a perspective diagram illustrating the physical structure of the charging station 76 according to this embodiment. For convenience in the following, three orthogonal directions shown in the drawing are respectively defined as forward-rearward direction (length direction), lateral direction (width direction) and vertical direction (height direction) of the charging station 76.

As seen in FIG. 9, the charging station 76 has a base plate 76a of substantially the same size as the vehicle 10 for retaining the vehicle 10 during charging, a guide 76b erected at the front end of the base plate 76a for constraining position of the vehicle 10 during charging, and a substantially triangular terminal unit 76c projecting rearward from an upper and laterally middle part of the guide 76b.

The terminal unit 76c is configured to be insertable between the pair of left-right battery charging terminals 34 of the vehicle 10, and the pair of left-right terminals 86 of the charging station 76 is symmetrically provided with respect to a longitudinal direction axis CL2 passing through the center of the charging station 76, whereby the structure enables charging of the onboard battery 32 through the terminals 86 and 34.

As shown in FIG. 4, in this embodiment the charging station 76 is installed inside the working area AR, and in an orientation perpendicular to the boundary wire 72.

In the charging station 76, the aforesaid battery charging unit 84 is mounted on a circuit board (not shown) accommodated inside the guide 76b, and the battery charging unit 84 has connected thereto the docking wire 90 for guiding the vehicle 10 to the docking position for docking with the charging terminals 86 and the station wire 92 for, in advance of the docking, guiding the vehicle 10 by enabling it to recognize and approach the position of the charging station 76.

Figure 10:
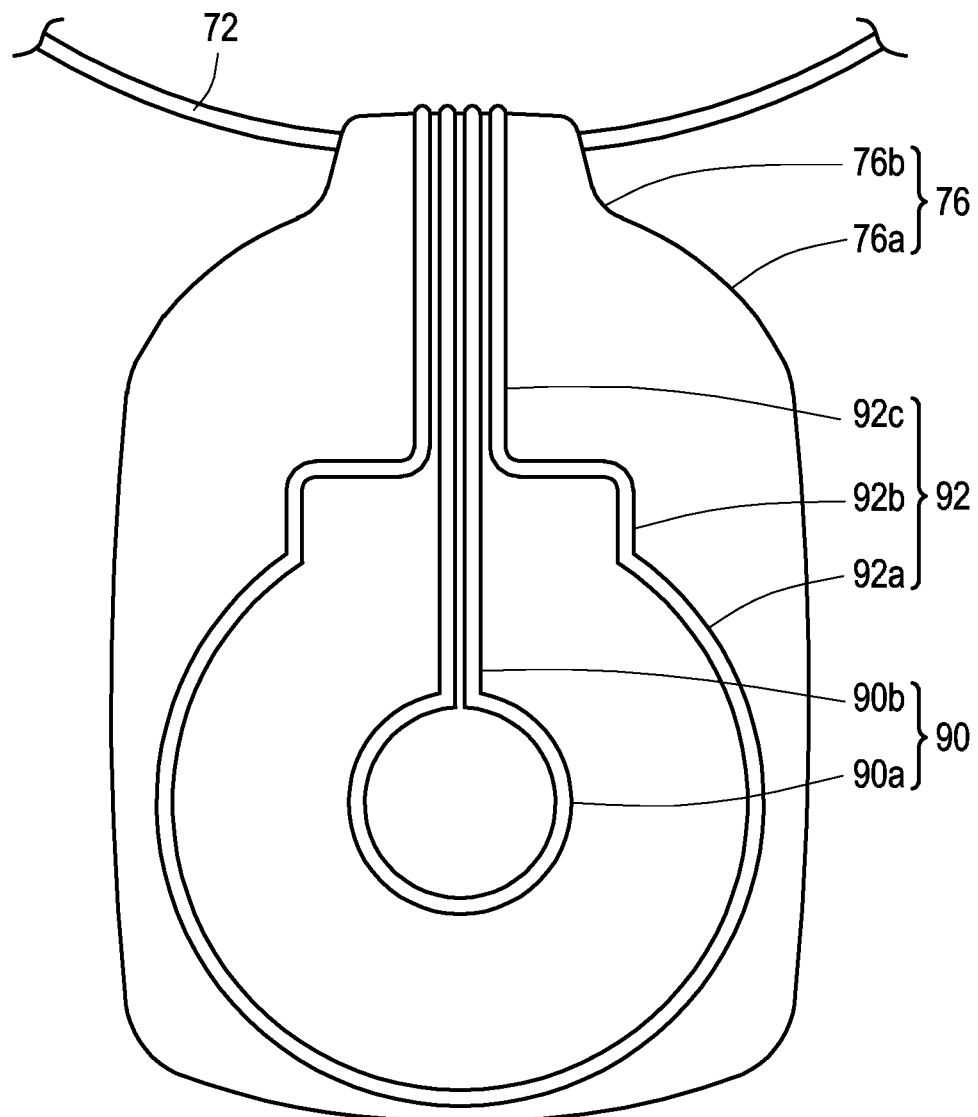
FIG. 10 is a top plan views of a base plate of the charging station shown in FIG. 9

As illustrated FIG. 10, the charging station incorporates the docking wire 90 and station wire 92 in addition to the base plate 76a.

Figure 11:
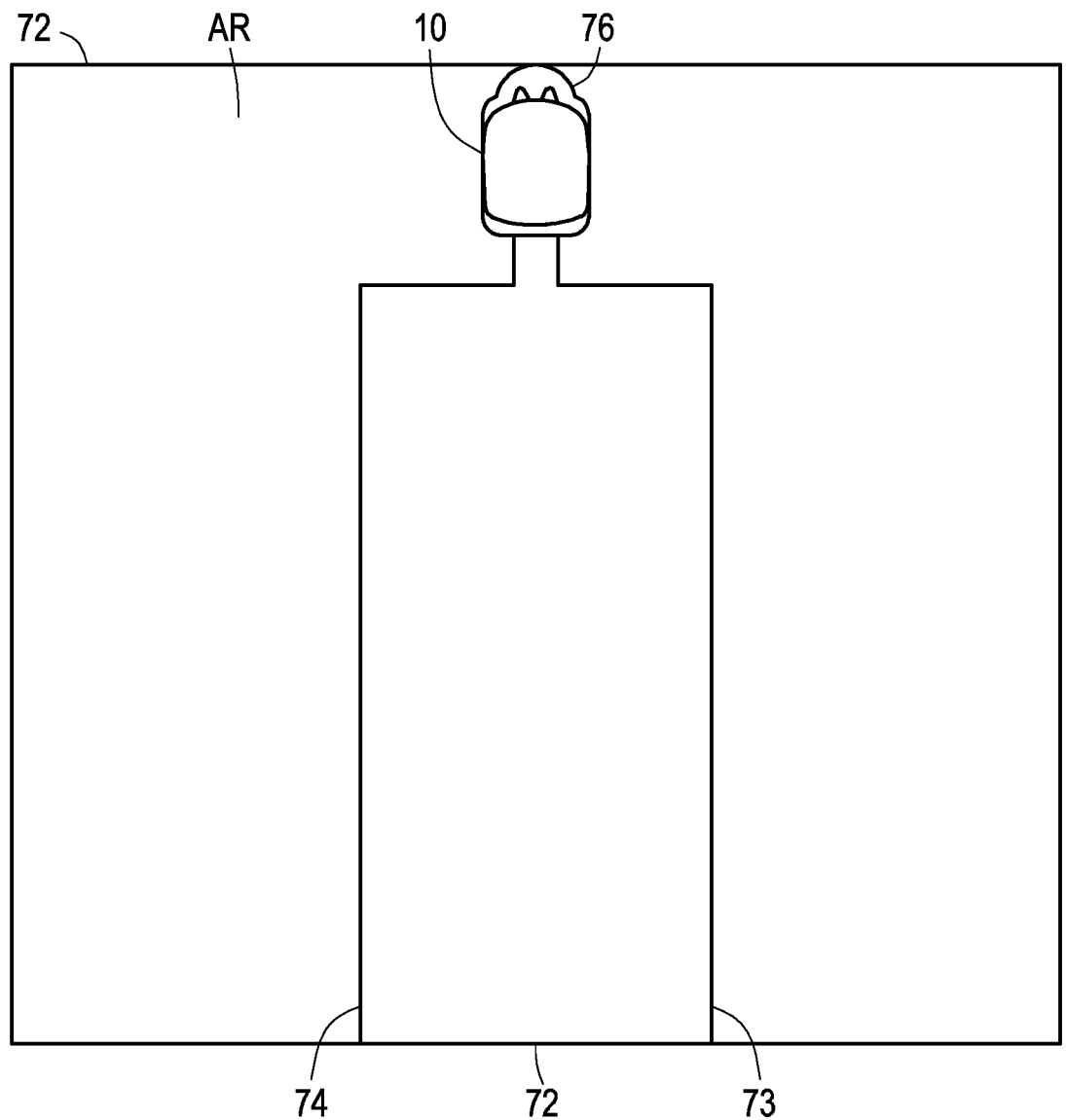
FIG. 11 is a schematic diagram illustrating a working area with a shortcut wire according to an embodiment of the disclosure.

Referring to FIG. 11, a working area AR of the vehicle 10 is delineated by the boundary wire 72. The boundary wire 72 is an example of an area wire. The boundary wire 72 surrounds the working area AR of the vehicle 10. Furthermore, a first shortcut wire 73 and a second shortcut wire 74 are disposed inside the working area AR delineated by the boundary wire 72. The first shortcut wire 73 and the second shortcut wire 74 are examples of a shortcut wire. The vehicle 10 is adapted to be guided by a signal emitted by a wire (the boundary wire 72, the shortcut wire 73, the shortcut wire 74 and the like) disposed at a working area AR. In more detail, the vehicle 10 may be driven in trace mode to circuit on or along the boundary wire 72, the shortcut wire 73 and the shortcut wire 74 and guided back to the charging station 76 for recharging or stand-by.

Figure 12:
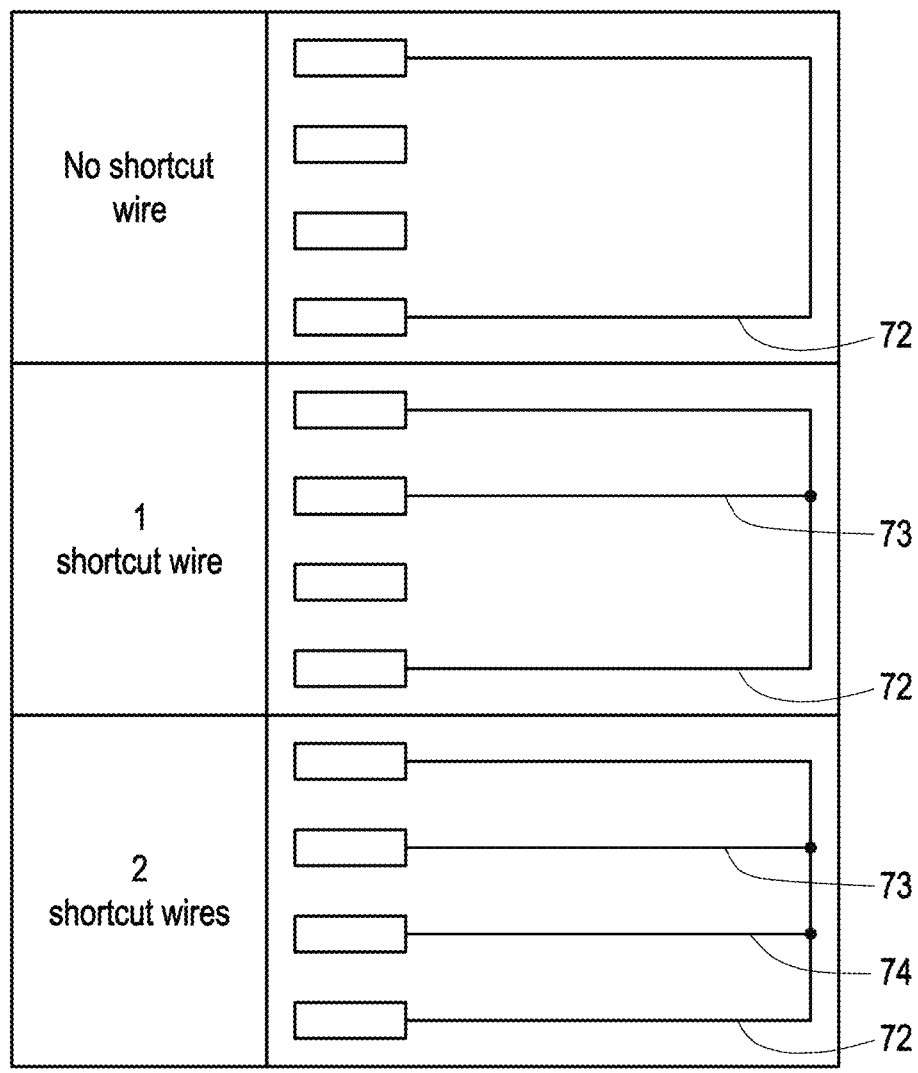
FIG. 12 is a schematic diagram illustrating an example of a connection of the wires according to an embodiment of the disclosure.

FIG. 12 is a schematic diagram illustrating an example of a connection of the wires according to an embodiment of the disclosure. In more detail, the connection of the wires in a case when "No shortcut wire" is provided, when "1 shortcut wire" is provided, and when "2 shortcut wires" are schematically illustrated. A different pulse train signal may be provided to each of the boundary wire 72, the first shortcut wire 73, and the second shortcut wire 74 respectively from the signal generating device 84c. Accordingly, when the vehicle 10 detects a wire, the vehicle is able to detect which wire is being detected based on the specific pulse train signal that is detected. In this way, the vehicle 10 may differentiate between the boundary wire 72, the docking wire 90, the station wire 92, the first shortcut wire 73, the second shortcut wire 74 and the like.

Figure 13:
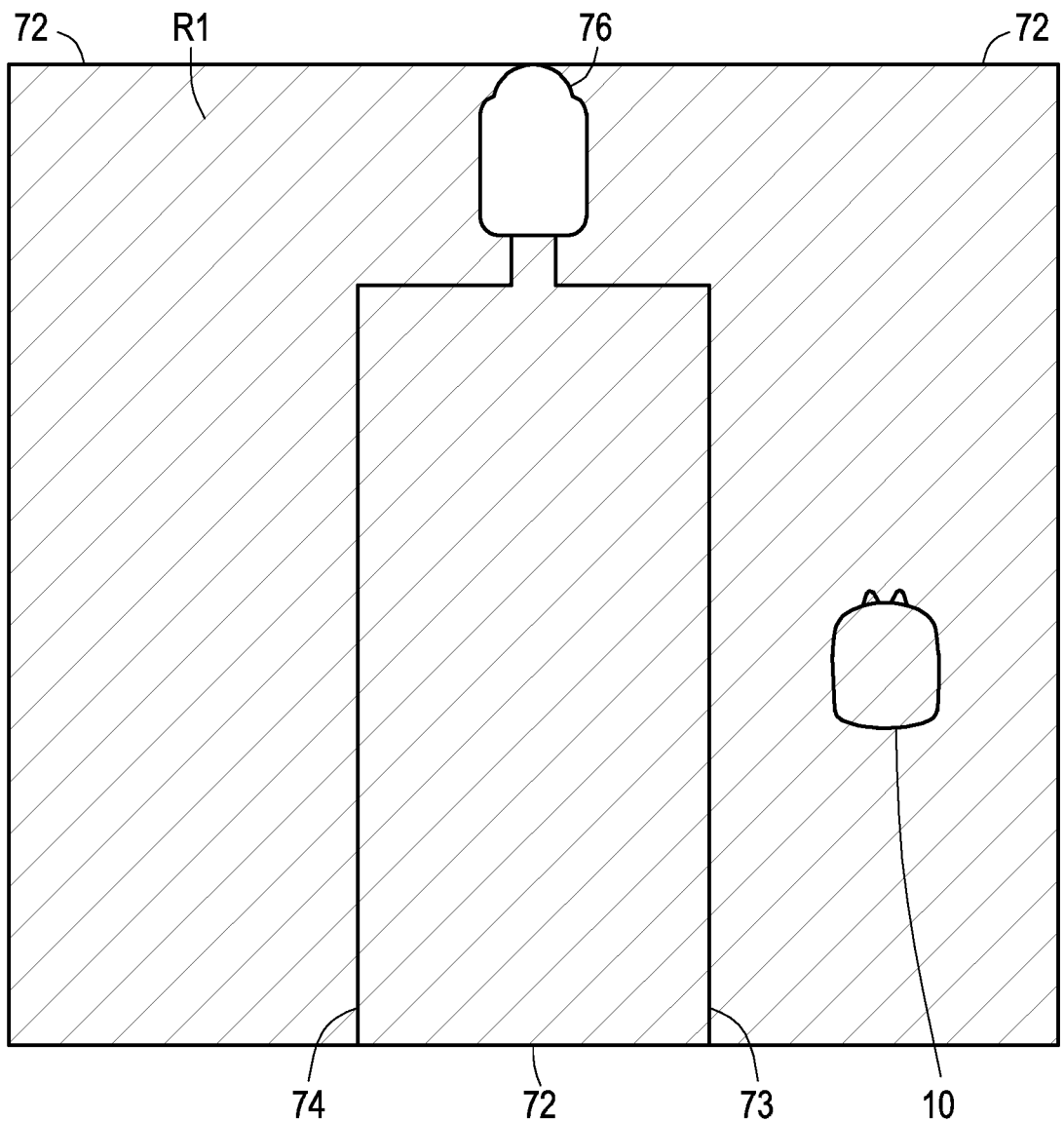
FIG. 13 is a schematic diagram illustrating an example coverage of an area signal according to an embodiment of the disclosure.
Figure 14:
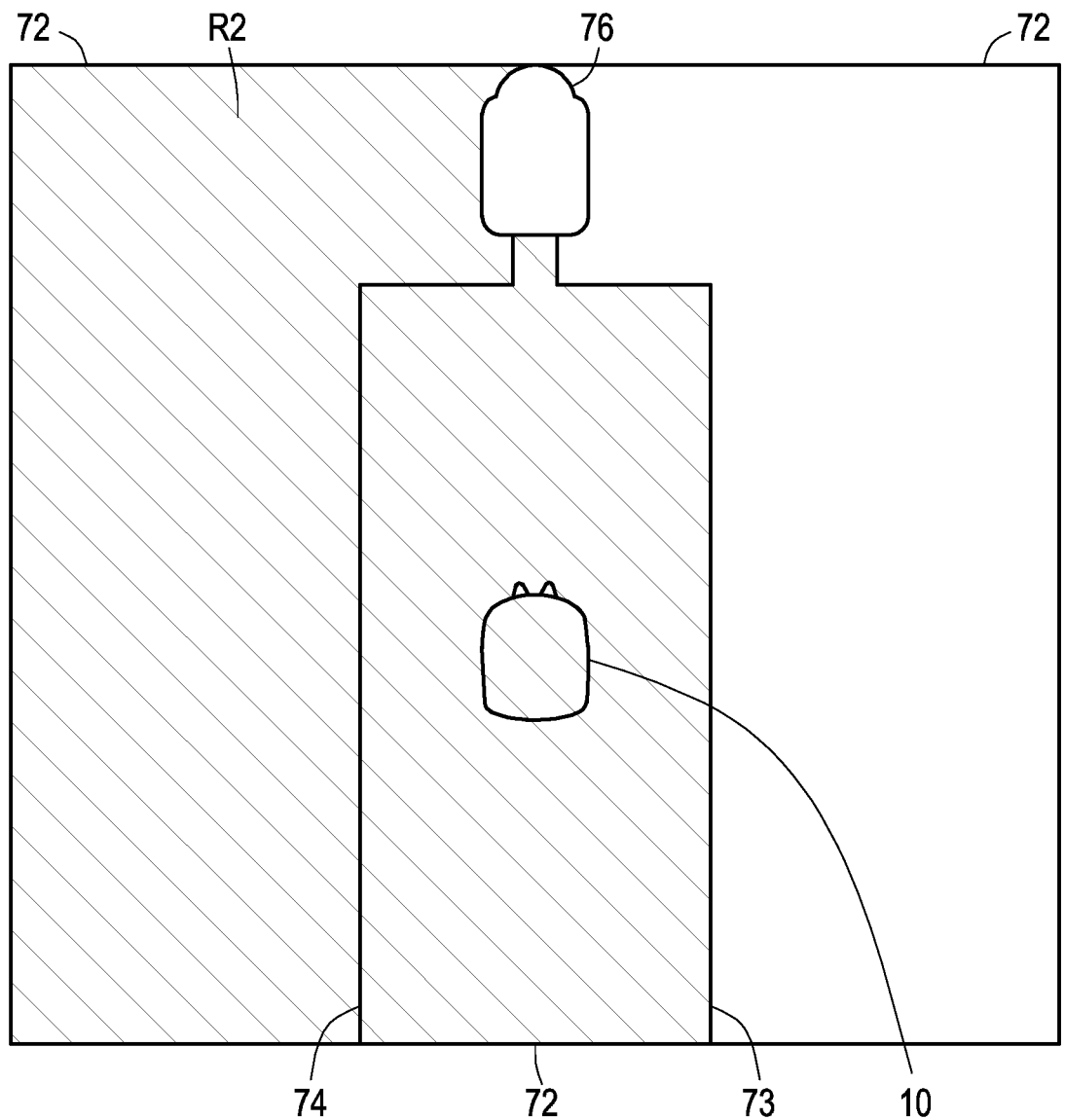
FIG. 14 is a schematic diagram illustrating an example coverage of a shortcut signal 1 according to an embodiment of the disclosure.
Figure 15:
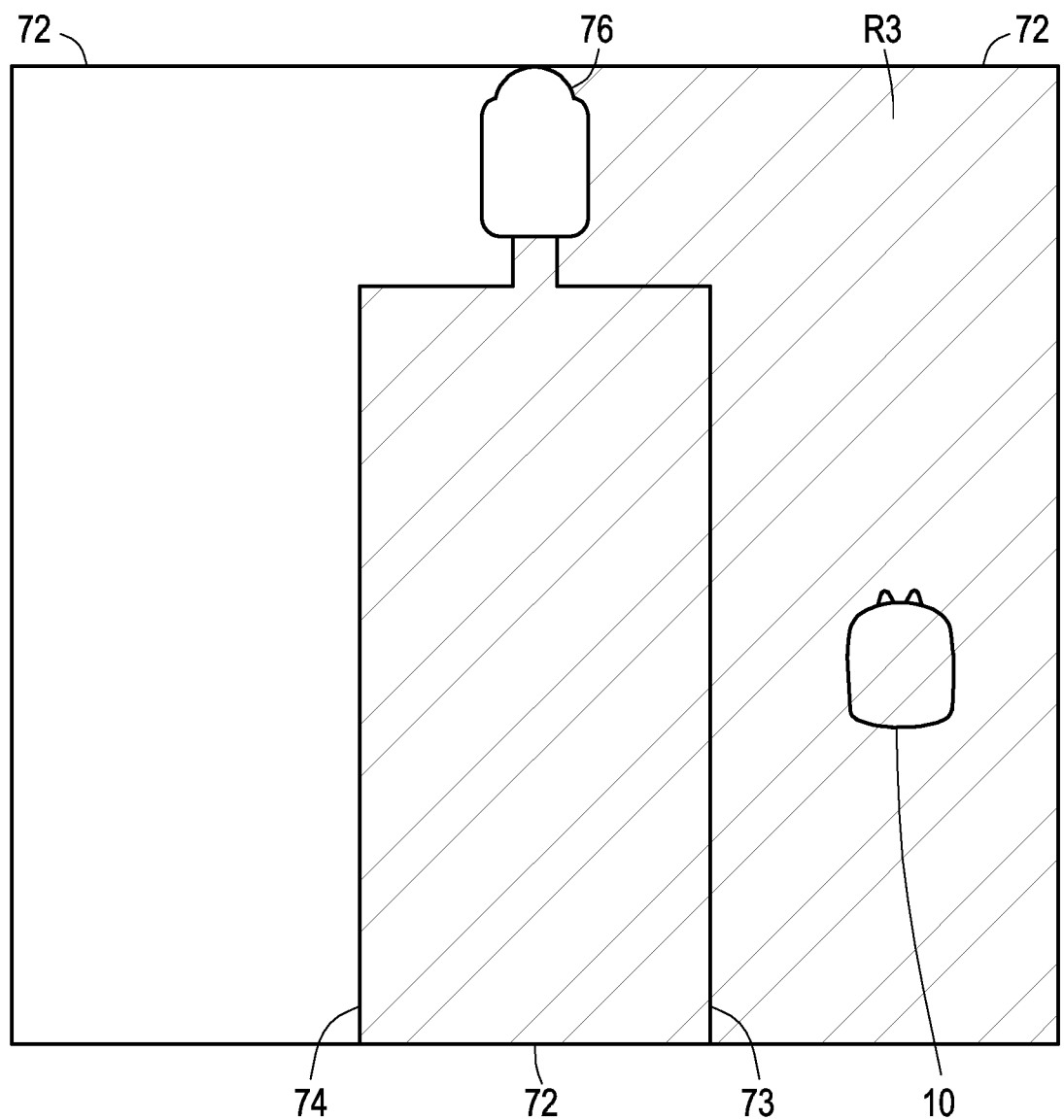
FIG. 15 is a schematic diagram illustrating an example coverage of a shortcut signal 2 according to an embodiment of the disclosure.

FIG. 13 is a schematic diagram illustrating an example coverage of an area signal according to an embodiment of the disclosure. FIG. 14 is a schematic diagram illustrating an example coverage of a shortcut signal 1 according to an embodiment of the disclosure. FIG. 15 is a schematic diagram illustrating an example coverage of a shortcut signal 2 according to an embodiment of the disclosure.

Referring to FIG. 13, the magnetic sensor 36 disposed on the vehicle 10 detects whether the vehicle 10 is inside or outside the first shaded region R1 of FIG. 13. That is to say, the magnetic sensor 36 detects the signal emitted by the wire (the boundary wire 72, the first shortcut wire 73, the second shortcut wire 74 and the like). For example, when the vehicle 10 crosses the boundary wire 72 from the inside of the first shaded region R1 to an outside of the first shaded region R1, the magnetic sensor 36 detects the vehicle 10 has crossed from the inside of the first shaded region R1 to the outside of the first shaded region R1 of FIG. 13. When the vehicle 10 crosses the boundary wire 72 from inside the first shaded region R1 to outside the first shaded region R1, the polarity of the magnetic field detected by the magnetic sensor 36 changes, and the magnetic sensor 36 detects the AREA SIGNAL has changed from IN→OUT. When the magnetic sensor 36 detects the AREA SIGNAL has changed from IN→OUT, the ECU 44 recognizes the vehicle 10 has crossed from the inside of the first shaded region R1 to the outside of the first shaded region R1 of FIG. 13.

Referring to FIG. 14, the magnetic sensor 36 disposed on the vehicle 10 detects whether the vehicle 10 is inside or outside the second shaded region R2 of FIG. 14. In other words, when the vehicle 10 crosses the boundary wire 72 from the inside of the second shaded region R2 to an outside of the second shaded region R2, or the vehicle 10 crosses the first shortcut wire 73 from the inside of the second shaded region R2 to an outside of the second shaded region R2, the magnetic sensor 36 detects the vehicle 10 has crossed from the inside of the second shaded region R2 to the outside of the second shaded region R2 of FIG. 14. When the vehicle 10 crosses the boundary wire 72 from inside the second shaded region R2 to outside the second shaded region R2, or the vehicle 10 crosses the first shortcut wire 73 from inside the second shaded region R2 to outside the second shaded region R2, the polarity of the magnetic field detected by the magnetic sensor 36 changes, and the magnetic sensor 36 detects the SHORTCUT SIGNAL 1 has changed from (IN→OUT). When the magnetic sensor 36 detects the SHORTCUT SIGNAL 1 has changed from (IN→OUT), the ECU 44 recognizes the vehicle 10 has crossed from the inside of the second shaded region R2 to the outside of the second shaded region R2 of FIG. 14.

Referring to FIG. 15, the magnetic sensor 36 disposed on the vehicle 10 detects whether the vehicle 10 is inside or outside the third shaded region R3 of FIG. 15. In other words, when the vehicle 10 crosses the boundary wire 72 from the inside of the third shaded region R3 to an outside of the third shaded region R3, or the vehicle 10 crosses the second shortcut wire 74 from the inside of the third shaded region R3 to an outside of the third shaded region R3, the magnetic sensor 36 detects the vehicle 10 has crossed from the inside of the third shaded region R3 to the outside of the third shaded region R3 of FIG. 15. When the vehicle 10 crosses the boundary wire 72 from inside the third shaded region R3 to outside the third shaded region R3, or the vehicle 10 crosses the second shortcut wire 74 from inside the third shaded region R3 to outside the third shaded region R3, the polarity of the magnetic field detected by the magnetic sensor 36 changes, and the magnetic sensor 36 detects the SHORTCUT SIGNAL 2 has changed from (IN→OUT). When the magnetic sensor 36 detects the SHORTCUT SIGNAL 2 has changed from (IN→OUT), the ECU 44 recognizes the vehicle 10 has crossed from the inside of the third shaded region R3 to the outside of the third shaded region R3 of FIG. 15.

Figure 16:
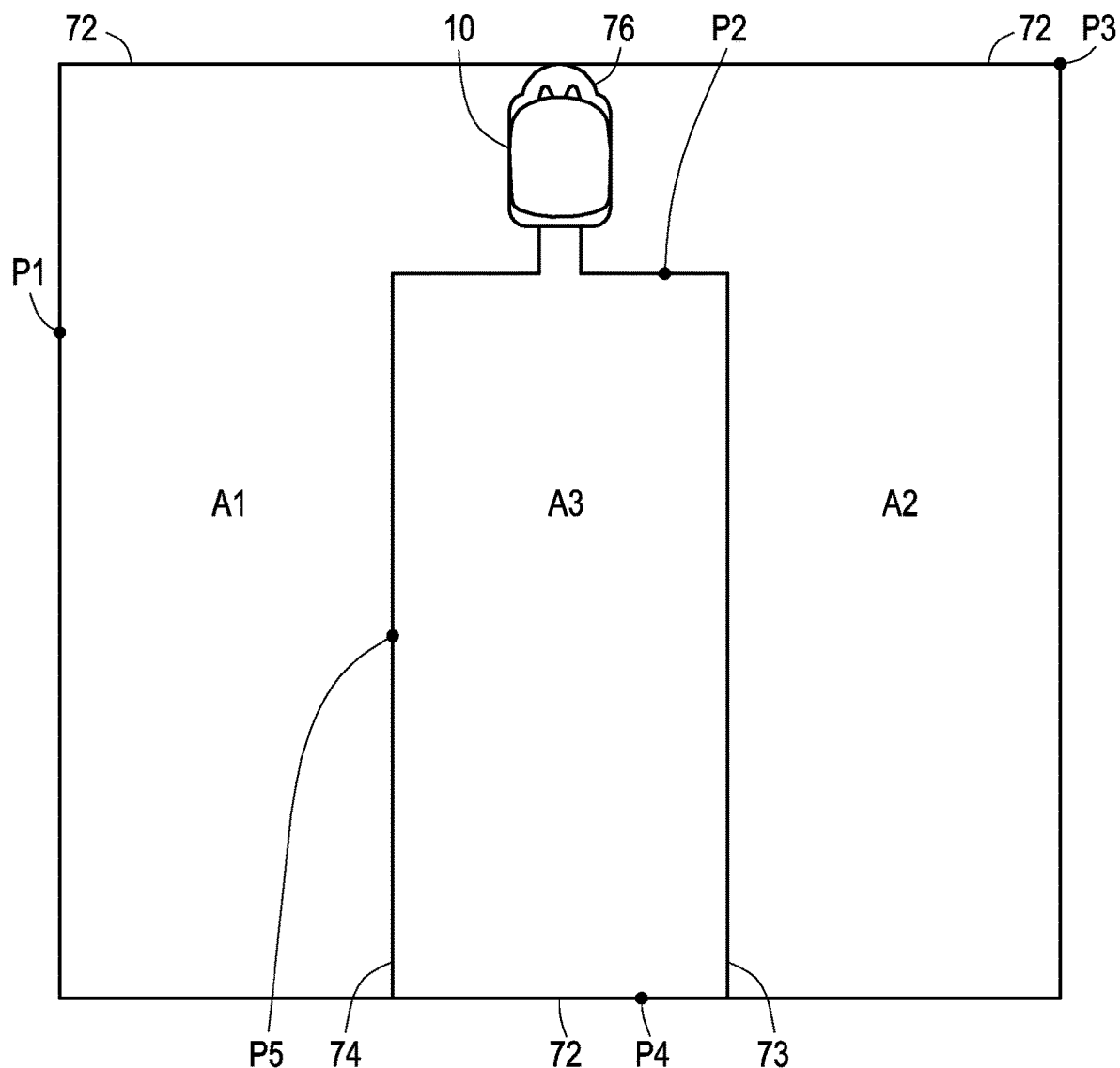
FIG. 16 is a schematic diagram illustrating an example in which the working area is divided into multiple areas A1, A2, A3 according to an embodiment of the disclosure.

FIG. 16 is a schematic diagram illustrating an example in which the working area is divided into multiple areas A1, A2, A3 according to an embodiment of the disclosure. FIG. 17 is a table illustrating an example on how the utility vehicle determines which of the multiple areas shown in FIG. 17 the utility vehicle is located in according to an embodiment of the disclosure.

Referring to FIG. 16, the working area AR may be divided into a first area A1, a second area A1 and a third area A3. The first area A1 is located at the area between the boundary wire 72 and the second shortcut wire 74. The second area A2 is located at the area between the boundary wire 72, the first shortcut wire 73 and the second shortcut wire 74. The third area A3 is located at the area between the boundary wire 72 and the first shortcut wire 73.

Referring to FIG. 17, a location of the vehicle 10 may be identified, for example, in the following manner. In a first case when the vehicle 10 is located at the first area A1 and the vehicle 10 crosses the boundary wire 72 from the inside of the first area A1 to the outside of the first area A1, then the following "JUDGEMENT CONDITION" will be satisfied. First, the magnetic sensor 36 detects the AREA SIGNAL has changed from IN→OUT, therefore the ECU 44 recognizes the vehicle 10 has crossed from the inside of the first shaded region R1 to the outside of the first shaded region R1 of FIG. 13. Second, the magnetic sensor 36 detects the SHORTCUT SIGNAL 1 has changed from IN→OUT, therefore the ECU 44 recognizes the vehicle 10 has crossed from the inside of the second shaded region R2 to the outside of the second shaded region R2 of FIG. 14. Third, the magnetic sensor 36 detects the SHORTCUT SIGNAL 2 has not changed. Specifically, the magnetic sensor 36 detects the SHORTCUT SIGNAL 2 has not changed, and is OUT (outside) of the third shaded region R3, therefore the ECU 44 recognizes the vehicle 10 is outside of the third shaded region R3 of FIG. 15. In another embodiment of the disclosure, when the vehicle 10 is too far outside (or away) from the third shaded region R3, then the SHORTCUT SIGNAL 2 may not be detected and the SHORTCUT SIGNAL 2 may be NONE. Accordingly, the vehicle 10 may be identified as being located in the first area A1 at the boundary wire 72.

In a second case when the vehicle 10 is located at the second area A2 and the vehicle 10 crosses the boundary wire 72 from the inside of the second area A2 to the outside of the second area A2, then the following "JUDGEMENT CONDITION" will be satisfied. First, the magnetic sensor 36 detects the AREA SIGNAL has changed from IN→OUT, therefore the ECU 44 recognizes the vehicle 10 has crossed from the inside of the first shaded region R1 to the outside of the first shaded region R1 of FIG. 13. Second, the magnetic sensor 36 detects the SHORTCUT SIGNAL 2 has changed from IN→OUT, therefore the ECU 44 recognizes the vehicle 10 has crossed from the inside of the third shaded region R3 to the outside of the third shaded region R3 of FIG. 15. Third, the magnetic sensor 36 detects the SHORTCUT SIGNAL 1 has not changed. Specifically, the magnetic sensor 36 detects the SHORTCUT SIGNAL 1 has not changed, and is OUT (outside) of the second shaded region R2, therefore the ECU 44 recognizes the vehicle 10 is outside of the second shaded region R2 of FIG. 14. In another embodiment of the disclosure, when the vehicle 10 is too far outside (or away) from the second shaded region R2, then the SHORTCUT SIGNAL 1 may not be detected and the SHORTCUT SIGNAL 1 may be NONE. Accordingly, the vehicle 10 may be identified as being located in the second area A2 at the boundary wire 72.

In a third case when the vehicle 10 is located at the third area A3 and the vehicle 10 crosses the boundary wire 72 from the inside of the third area A3 to the outside of the third area A3, then the following "JUDGEMENT CONDITION" will be satisfied. First, the magnetic sensor 36 detects the AREA SIGNAL has changed from IN→OUT, therefore the ECU 44 recognizes the vehicle 10 has crossed from the inside of the first shaded region R1 to the outside of the first shaded region R1 of FIG. 13. Second, the magnetic sensor 36 detects the SHORTCUT SIGNAL 1 has changed from IN→OUT, therefore the ECU 44 recognizes the vehicle 10 has crossed from the inside of the second shaded region R2 to the outside of the second shaded region R2 of FIG. 14. Third, the magnetic sensor 36 detects the SHORTCUT SIGNAL 2 has changed from IN→OUT, therefore the ECU 44 recognizes the vehicle 10 has crossed from the inside of the third shaded region R3 to the outside of the third shaded region R3 of FIG. 15. Accordingly, the vehicle 10 may be identified as being located in the third area A3 at the boundary wire 72.

Although it was described in the above embodiment that the vehicle 10 crosses the boundary wire 72 in the first case, the second case and the third case, it may be understood as at least one of the magnet sensors 36 out of the plurality of magnet sensors (36L, 36R, 36C or the like) disposed on the vehicle 10 has crossed the boundary wire 72. Since the boundary wire 72 delineates the working area AR of the vehicle 10, the ECU 44 may steer the vehicle 10 back into the working area AR when the magnetic sensor 36 detects the boundary wire 72.

Furthermore, it was described in the above embodiment that the vehicle 10 crosses the boundary wire 72 (i.e. a polarity change in the magnetic field detected by the magnetic sensor 36) in the first case, the second case and the third case, however in another embodiment of the disclosure, the vehicle does not need to cross the boundary wire 72 for a location of the vehicle 10 to be identified. For example, when the magnetic field signal H emitted from the boundary wire 72 detected by the magnetic sensor 36 meets or exceeds a predetermined threshold value, the ECU 44 may determine that the vehicle 10 has reached the boundary wire 72 (or near a proximity of the boundary wire 72) even though the polarity change in the magnetic field signal H was not detected by the magnetic sensor 36. That is to say, the JUDGEMENT CONDITION of the first case, second case and third case specified in FIG. 17 is described as one embodiment of the disclosure only, and other judgement conditions may be set according to requirements.

The JUDGEMENT CONDITION of the first case, the second case, and the third case are examples of predetermined conditions used to identify the location of the vehicle 10 according to an embodiment of the disclosure. The predetermined conditions may be stored, for example, in the memory 44c of the vehicle 10.

Next a fourth case where the vehicle 10 crosses the first shortcut wire 73 and a fifth case where the vehicle 10 crosses the second shortcut wire 74 will be described. Referring to FIG. 17, when the vehicle 10 approaches the first shortcut wire 73, the vehicle 10 may approach the first shortcut wire 73 from the LEFT direction relative to the first shortcut wire 73, or the RIGHT direction relative to the first shortcut wire 73. The RIGHT and LEFT direction described herein are relative direction for aiding the understanding of the disclosure only, and the LEFT and RIGHT directions may alternatively be understood as being a first direction and a second direction.

In the fourth case, when the vehicle 10 is located at the third area A3 and the vehicle 10 crosses the first shortcut wire 73 to enter the second area A2 (APPOACH DIRECTION=LEFT), then the following "JUDGEMENT CONDITION" will be satisfied. First, the magnetic sensor 36 detects the AREA SIGNAL has not changed, and is IN (inside) of the first shaded region R1, therefore the ECU 44 recognizes the vehicle 10 is inside of the first shaded region R1 of FIG. 13. Second, the magnetic sensor 36 detects the SHORTCUT SIGNAL 1 has changed from IN→OUT, therefore the ECU 44 recognizes the vehicle 10 has crossed from the inside of the second shaded region R2 to the outside of the second shaded region R2 of FIG. 14. Third, the magnetic sensor 36 detects the SHORTCUT SIGNAL 2 has not changed. Specifically, the magnetic sensor 36 detects the SHORTCUT SIGNAL 2 has not changed, and is IN (inside) of the third shaded region R3, therefore the ECU 44 recognizes the vehicle 10 is inside of the third shaded region R3 of FIG. 15. In another embodiment of the disclosure, when the vehicle 10 is too far inside the third shaded region R3, then the SHORTCUT SIGNAL 2 may not be detected and the SHORTCUT SIGNAL 2 may be NONE. Accordingly, the vehicle 10 may be identified as being located in the third area A3 at the first shortcut wire 73.

Alternatively, in the fourth case, when the vehicle 10 is located at the second area A2 and the vehicle 10 crosses the first shortcut wire 73 to enter the third area A3 (APPOACH DIRECTION=RIGHT), then the following "JUDGEMENT CONDITION" will be satisfied. First, the magnetic sensor 36 detects the AREA SIGNAL has not changed, and is IN (inside) of the first shaded region R1, therefore the ECU 44 recognizes the vehicle 10 is inside of the first shaded region R1 of FIG. 13. Second, the magnetic sensor 36 detects the SHORTCUT SIGNAL 1 has changed from OUT→IN, therefore the ECU 44 recognizes the vehicle 10 has crossed from the outside of the second shaded region R2 to the inside of the second shaded region R2 of FIG. 14. Third, the magnetic sensor 36 detects the SHORTCUT SIGNAL 2 has not changed. Specifically, the magnetic sensor 36 detects the SHORTCUT SIGNAL 2 has not changed, and is IN (inside) of the third shaded region R3, therefore the ECU 44 recognizes the vehicle 10 is inside of the third shaded region R3 of FIG. 15. In another embodiment of the disclosure, when the vehicle 10 is too far inside the third shaded region R3, then the SHORTCUT SIGNAL 2 may not be detected and the SHORTCUT SIGNAL 2 may be NONE. Accordingly, the vehicle 10 may be identified as being located in the second area A2 at the first shortcut wire 73.

In the fifth case, when the vehicle 10 is located at the third area A3 and the vehicle 10 crosses the second shortcut wire 74 to enter the first area A1 (APPOACH DIRECTION=RIGHT), then the following "JUDGEMENT CONDITION" will be satisfied. First, the magnetic sensor 36 detects the AREA SIGNAL has not changed, and is IN (inside) of the first shaded region R1, therefore the ECU 44 recognizes the vehicle 10 is inside of the first shaded region R1 of FIG. 13. Second, the magnetic sensor 36 detects the SHORTCUT SIGNAL 1 has not changed. Specifically, the magnetic sensor 36 detects the SHORTCUT SIGNAL 1 has not changed, and is IN (inside) of the second shaded region R2, therefore the ECU 44 recognizes the vehicle 10 is inside of the second shaded region R2 of FIG. 14. In another embodiment of the disclosure, when the vehicle 10 is too far inside the second shaded region R2, then the SHORTCUT SIGNAL 1 may not be detected and the SHORTCUT SIGNAL 1 may be NONE. Third, the magnetic sensor 36 detects the SHORTCUT SIGNAL 2 has changed from IN→OUT, therefore the ECU 44 recognizes the vehicle 10 has crossed from the inside of the third shaded region R3 to the outside of the third shaded region R3 of FIG. 15. Accordingly, the vehicle 10 may be identified as being located in the third area A3 at the second shortcut wire 74.

Alternatively, in the fifth case, when the vehicle 10 is located at the first area A1 and the vehicle 10 crosses the second shortcut wire 74 to enter the third area A3 (APPOACH DIRECTION=LEFT), then the following "JUDGEMENT CONDITION" will be satisfied. First, the magnetic sensor 36 detects the AREA SIGNAL has not changed, and is IN (inside) of the first shaded region R1, therefore the ECU 44 recognizes the vehicle 10 is inside of the first shaded region R1 of FIG. 13. Second, the magnetic sensor 36 detects the SHORTCUT SIGNAL 1 has not changed, and is IN (inside) of the second shaded region R2, therefore the ECU 44 recognizes the vehicle 10 is inside of the second shaded region R2 of FIG. 14. In another embodiment of the disclosure, when the vehicle 10 is too far inside the second shaded region R2, then the SHORTCUT SIGNAL 1 may not be detected and the SHORTCUT SIGNAL 1 may be NONE. Third, the magnetic sensor 36 detects the SHORTCUT SIGNAL 2 has changed from OUT→IN, therefore the ECU 44 recognizes the vehicle 10 has crossed from the outside of the third shaded region R3 to the inside of the third shaded region R3 of FIG. 15. Accordingly, the vehicle 10 may be identified as being located in the first area A1 at the second shortcut wire 74.

Although it was described in the above embodiment that the vehicle 10 crosses the first shortcut wire 73 in the fourth case, and crosses the second shortcut wire 74 in the fifth case, it may be understood as at least one of the magnet sensors 36 out of the plurality of magnet sensors (36L, 36R, 36C or the like) disposed on the vehicle 10 has crossed the first shortcut wire 73 or the second shortcut wire 74.

Furthermore, it was described in the above embodiment that the vehicle 10 crosses the first shortcut wire 73 in the fourth case and crosses the second shortcut wire 74 in the fifth case (i.e. a polarity change in the magnetic field detected by the magnetic sensor 36), however in another embodiment of the disclosure, the vehicle does not need to cross the first shortcut wire 73 or the second shortcut wire 74 for a location of the vehicle 10 to be identified. For example, when the magnetic field signal H emitted from the first shortcut wire 73 detected by the magnetic sensor 36 meets or exceeds a predetermined threshold value, the ECU 44 may determine that the vehicle 10 has reached the first shortcut wire 73 (or near a proximity of the first shortcut wire 73) even though the polarity change in the magnetic field signal H was not detected by the magnetic sensor 36. In another example, when the magnetic field signal H emitted from the second shortcut wire 74 detected by the magnetic sensor 36 meets or exceeds a predetermined threshold value, the ECU 44 may determine that the vehicle 10 has reached the second shortcut wire 74 (or near a proximity of the second shortcut wire 74) even though the polarity change in the magnetic field signal H was not detected by the magnetic sensor 36. That is to say, the JUDGEMENT CONDITION of the fourth case and the fifth case specified in FIG. 17 is described as one embodiment of the disclosure only, and other judgement conditions may be set according to requirements.

The JUDGEMENT CONDITION of the fourth case and the fifth case are examples of predetermined conditions used to identify the location of the vehicle 10 according to an embodiment of the disclosure. The predetermined conditions may be stored, for example, in the memory 44c of the vehicle 10.

Referring to FIG. 16, the working area AR is divided into the first area A1, the second area A2, and the third area A3 according to an embodiment of the disclosure. However, the number of wires and the number of areas are not limited hereto and may be set according to requirements.

A location of the vehicle 10 may be determined based on the JUDGEMENT CONDITION of the first case, the second case, the third case, the fourth case, and the fifth case as was described above. For example, when the JUDGEMENT CONDITION of the first case shown in FIG. 17 are satisfied, the vehicle 10 may be identified to be in the first area A1 of FIG. 16, and located at or near the boundary wire 72 in the first area A1. Similarly, for example, when the JUDGEMENT CONDITION of the second case shown in FIG. 17 are satisfied, the vehicle 10 may be identified to be in the second area A2 of FIG. 16, and located at or near the boundary wire 72 in the second area A2. Similarly, for example, when the JUDGEMENT CONDITION of the third case shown in FIG. 17 are satisfied, the vehicle 10 may be identified to be in the third area A3 of FIG. 16, and located at or near the boundary wire 72 in the third area A3. Similarly, for example, when the JUDGEMENT CONDITION of the fourth case shown in FIG. 17 are satisfied, the vehicle 10 may be identified to be in the second area A2 or the third area A3 of FIG. 16 (depending on the APPROACH DIRECTION), and located at or near the first shortcut wire 73. Similarly, for example, when the JUDGEMENT CONDITION of the fifth case shown in FIG. 17 are satisfied, the vehicle 10 may be identified to be in the first area A1 or the third area A3 of FIG. 16 (depending on the APPROACH DIRECTION), and located at or near the second shortcut wire 74.

As described above, the ECU 44 identifies an area among a plurality of areas (A1, A2, A3) in the working area AR in which the vehicle 10 is located in based on a signal type (such as the pulse train signal) and a polarity of the magnetic field signal H of the wire detected by the magnetic sensor 36, and determines a trace direction of the vehicle 10 based on the signal type and the polarity of the wire detected by the magnetic sensor 36.

In more detail, the ECU 44 identifies the area among the plurality of areas (A1, A2, A3) in the working area AR in which the vehicle 10 is located in, based on a signal type (such as the pulse train signal) and a polarity of the magnetic field signal H of the area wire 72, a signal type and a polarity of the magnetic field signal H of the first shortcut wire 73, and a signal type and a polarity of the magnetic field signal H of the second shortcut wire 74 detected by the magnetic sensor 36. The ECU 44 of the vehicle 10 may determine a trace direction of the vehicle 10 based on the signal types and the polarities of the area wire and the shortcut wires detected by the magnetic sensor 36.

By identifying the area A1, A2, A3 that the vehicle 10 is located in, and further identifying the wire (the boundary wire 72, the first shortcut wire 73, the second shortcut wire 74) that the magnetic sensor 36 has detected, the location of the vehicle 10 may be determined and the vehicle 10 may be controlled to travel in the a desirable direction.

For example, the vehicle 10 may be identified as being located in the first area A1 at the second shortcut wire 74. In this situation, for example, the vehicle 10 may be controlled to travel counter clockwise in the first area A1 along the second shortcut wire 74 to quickly reach the station 76 and battery consumption may be reduced.

In another example, the vehicle 10 may be identified as being located in the first area A1 at the boundary wire 72. In this situation, for example, the vehicle 10 may be controlled to travel clockwise in the first area A1 along the boundary wire 72 to reach the station 76. Alternatively, for example, the vehicle 10 may be controlled to travel counter clockwise in the first area A1 along the boundary wire 72 to detect the second shortcut wire 74, and trace the second shortcut wire 74 back to the station 76.

When the vehicle 10 is located in the first area A1, the second area A2, or the third area A3, the location of the vehicle 10 may be determined and the vehicle 10 may be controlled to travel in the desirable direction.

In an embodiment of the disclosure, the vehicle 10 may trace the boundary wire 72 in trace mode to return to the station 76. When at least one of the magnetic sensors 36L, 36R, 36C detects the shortcut wire (the first shortcut wire 73 or the second shortcut wire 74) while the vehicle 10 is tracing the area wire 72 at a predetermined variable distance, the ECU 44 is configured to control the vehicle 10 to trace the shortcut wire (the first shortcut wire 73 or the second shortcut wire 74) at a predetermined variable distance back to the station 76. In a situation that the working area AR is large, the possibility of the vehicle 10 detecting the shortcut wire may be low. Therefore, the vehicle 10 may first trace the boundary wire 72 and then trace the shortcut wire after the shortcut wire is detected. In this way, the effect that a time for detecting the shortcut wire may be reduced and power consumption of the battery may be reduced.

For example, when the vehicle 10 detects the boundary wire 72 at a fourth point P4 shown in FIG. 16, the vehicle 10 may trace the boundary wire 72 in trace mode to return to the station 76. However, when the magnetic sensor 36 detects the first shortcut wire 73 while the vehicle 10 is tracing the area wire 72 at a predetermined variable distance towards the RIGHT direction, the ECU 44 is configured to control the vehicle 10 to trace the first shortcut wire 73 at a predetermined variable distance back to the station 76. Here, the vehicle 10 may trace the first shortcut wire 73 while the vehicle 10 stays in the third area A3.

In another embodiment, the vehicle 10 may trace the first shortcut wire 73 while the vehicle 10 stays in the second area A2. In more detail, when the magnetic sensor 36 detects the first shortcut wire 73 while the vehicle 10 is tracing the boundary wire 72 at a predetermined variable distance towards the RIGHT direction, the ECU 44 is configured to control the vehicle 10 to cross over the detected first shortcut wire 73 such that a polarity of the magnetic field signal H of the first shortcut wire 73 detected by the magnetic sensor 36 changes to an opposite polarity, and the ECU 44 controls the vehicle 10 to trace the first shortcut wire 73 at a predetermined variable distance at the opposite polarity while the vehicle 10 stays in the second area A2. When the vehicle 10 crosses over the first shortcut wire 73 to trace the first shortcut wire 73, the effect that a turning angle of the vehicle 10 may be made to be more gradual such that a formation of a rut may be suppressed may be achieved. In another embodiment, the vehicle 10 may trace directly on top the first shortcut wire 73 such the vehicle 10 is located in both the second area A2 and the third area A3.

In another embodiment, for example, when the vehicle 10 detects the boundary wire 72 at a fourth point P4 shown in FIG. 16, the vehicle 10 may trace the boundary wire 72 in trace mode to return to the station 76. However, when the magnetic sensor 36 detects the second shortcut wire 74 while the vehicle 10 is tracing the area wire 72 at a predetermined variable distance towards the LEFT direction, the ECU 44 is configured to control the vehicle 10 to trace the second shortcut wire 74 at a predetermined variable distance back to the station 76. Here, the vehicle 10 may trace the second shortcut wire 74 while the vehicle 10 stays in the third area A3.

In another embodiment, the vehicle 10 may trace the second shortcut wire 74 while the vehicle 10 stays in the first area A1. In more detail, when the magnetic sensor 36 detects the second shortcut wire 74 while the vehicle 10 is tracing the boundary wire 72 at a predetermined variable distance towards the LEFT direction, the ECU 44 is configured to control the vehicle 10 to cross over the detected second shortcut wire 74 such that a polarity of the magnetic field signal H of the second shortcut wire 74 detected by the magnetic sensor 36 changes to an opposite polarity, and the ECU 44 controls the vehicle 10 to trace the second shortcut wire 74 at a predetermined variable distance at the opposite polarity while the vehicle 10 stays in the first area A1. When the vehicle 10 crosses over the second shortcut wire 74 to trace the second shortcut wire 74, the effect that a turning angle of the vehicle 10 may be made to be more gradual such that a formation of a rut may be suppressed may be achieved. In another embodiment, the vehicle 10 may trace directly on top the second shortcut wire 74 such the vehicle 10 is located in both the first area A1 and the third area A3.

Figure 18:
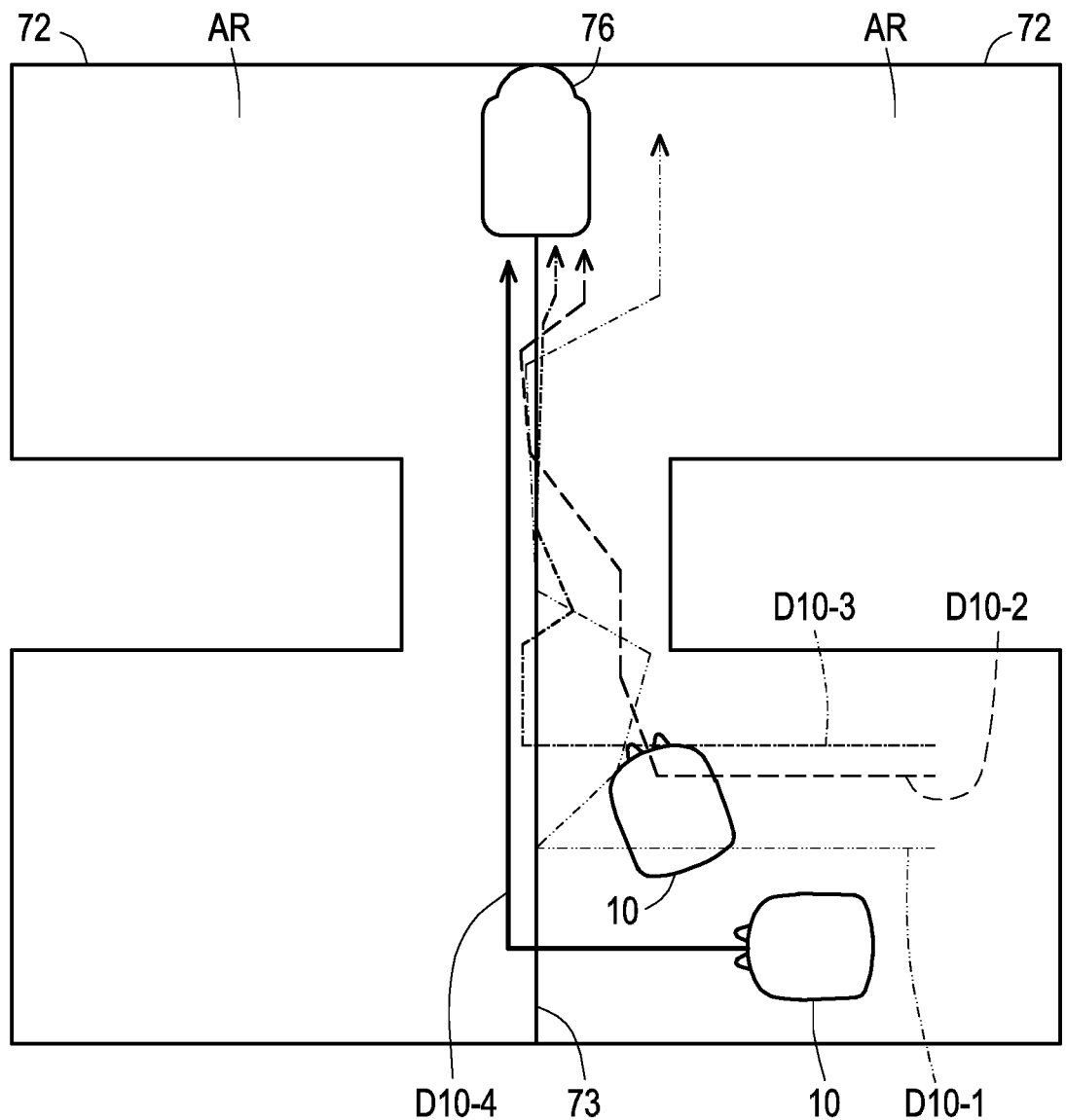
FIG. 18 is a schematic diagram illustrating examples of a travel path of the utility vehicle according to an embodiment of the disclosure.

FIG. 18 is a schematic diagram illustrating examples of a travel path of the utility vehicle according to an embodiment of the disclosure. Referring to FIG. 18, a narrow portion is provided in the working area AR. Furthermore, a first travel path D10-1, a second travel path D10-2, a third travel path D10-3, and a fourth travel path D10-4 are provided. The travel path of the vehicle 10 are examples only, and the disclosure is not limited thereto. In an embodiment of the disclosure, when the vehicle 10 traces the boundary wire 72 at a predetermined variable distance from the boundary wire 72 and detects the first shortcut wire 73, the vehicle 10 traces the first shortcut wire 73 back to the station 76 at a predetermined variable distance from the first shortcut wire 73. However, while tracing the first shortcut wire 73, the vehicle 10 may run into (or cross) the boundary wire 72 when travelling through the narrow portion and the vehicle 10 may be unable to travel outside the working area AR delineated by the boundary wire 72. Therefore, in an embodiment of the disclosure, when the magnetic sensor 36 detects the boundary wire 72 while the vehicle 10 is tracing the shortcut wire 73 at a predetermined variable distance, the ECU 44 may control the vehicle 10 to trace on top the shortcut wire 73. In this way, the effect that the vehicle 10 may travel through a narrow portion of the working area AR such as the narrow portion shown in FIG. 18 may be achieved.

Furthermore, it was described in the above embodiment that the vehicle 10 runs into or crosses the boundary wire 72 (i.e. a polarity change in the magnetic field detected by the magnetic sensor 36), however in another embodiment of the disclosure, the vehicle does not need to cross the boundary wire 72 while tracing the shortcut wire 73. For example, when the magnetic field signal H emitted from the boundary wire 72 detected by the magnetic sensor 36 meets or exceeds a predetermined threshold value, the ECU 44 may determine that the vehicle 10 has reached the boundary wire 72 (or near a proximity of the boundary wire 72) even though the polarity change in the magnetic field signal H was not detected by the magnetic sensor 36. In more detail, when the magnetic sensor 36 detects the boundary wire 72 while the vehicle 10 is tracing the shortcut wire 73 at a predetermined variable distance, the ECU 44 may control the vehicle 10 to trace on top the shortcut wire 73 to avoid (or not cross) the boundary wire 72. In this way, the effect that the vehicle 10 may travel through a narrow portion of the working area AR such as the narrow portion shown in FIG. 18 may be achieved.

Referring to FIG. 18, the fourth travel path D10-4, illustrates an embodiment wherein when the magnetic sensor 36 detects the shortcut wire 73 while vehicle 10 is tracing the area wire 72 at a predetermined variable distance, the ECU 44 is configured to control the vehicle 10 to cross over the detected shortcut wire 73 such that a polarity of the signal detected by the magnetic sensor changes to an opposite polarity, and the ECU 44 controls the vehicle 10 to trace the shortcut wire 73 at a predetermined variable distance while maintaining the opposite polarity In the above described embodiments, the vehicle 10 that is a robotic lawnmower including a blade for cutting grass was described. However, the disclosure is not limited thereto, and the vehicle 10 may be a cultivator for farming, a snow plow for plowing snow, a transport vehicle for transporting goods, or the like.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An autonomous work vehicle adapted to be guided by a signal emitted by a wire disposed at a working area, the autonomous work vehicle comprising:

a control unit comprising a processor; and at least one sensor, detecting the signal emitted by the wire, wherein the wire includes an area wire surrounding the working area, and a shortcut wire disposed inside the working area, and when the at least one sensor detects the shortcut wire while the autonomous work vehicle is tracing the area wire at a predetermined variable distance, the control unit is configured to control the autonomous work vehicle to trace the shortcut wire at a predetermined variable distance, wherein when the at least one sensor detects the shortcut wire while the autonomous work vehicle is tracing the area wire at a predetermined variable distance, the control unit is configured to control the autonomous work vehicle to cross over the detected shortcut wire such that a polarity of the signal detected by the at least one sensor changes to an opposite polarity, and the control unit controls the autonomous work vehicle to trace the shortcut wire at a predetermined variable distance while maintaining the opposite polarity.

2. The autonomous work vehicle according to claim 1, wherein the control unit identifies an area among a plurality of areas in the working area in which the autonomous work vehicle is located in based on a signal type and a polarity of the wire detected by the at least one sensor, and determines a trace direction of the autonomous work vehicle based on the signal type and the polarity of the wire detected by the at least one sensor.

3. The autonomous work vehicle according to claim 2, wherein the control unit identifies the area among the plurality of areas in the working area in which the autonomous work vehicle is located in, based on a signal type and a polarity of the area wire and a signal type and a polarity of the shortcut wire detected by the at least one sensor, and determines a trace direction of the autonomous work vehicle based on the signal types and the polarities of the area wire and the shortcut wire detected by the at least one sensor.

4. The autonomous work vehicle according to claim 3, wherein the at least one sensor includes a first, second, and third sensor.

5. The autonomous work vehicle according to claim 1, wherein when the at least one sensor detects the area wire while the autonomous work vehicle is tracing the shortcut wire at a predetermined variable distance, the control unit controls the autonomous work vehicle to trace on top the shortcut wire.

* * * * *